United States Patent [19]

Lundell et al.

[11] Patent Number: 5,087,004
[45] Date of Patent: Feb. 11, 1992

[54] CONVERTIBLE MOUNTING APPARATUS

[75] Inventors: Louis J. Lundell, Buffalo Grove; Kenneth W. Carlson, Hawthorn Woods, both of Ill.

[73] Assignee: Motorola, Inc., Schaumburg, Ill.

[21] Appl. No.: 590,208

[22] Filed: Sep. 28, 1990

[51] Int. Cl.⁵ ............................................. H04M 1/11
[52] U.S. Cl. .................................. 248/126; 248/207; 248/346
[58] Field of Search ................. 248/126, 180, 188.2, 248/188.6, 439, 346, 207

[56] References Cited

U.S. PATENT DOCUMENTS

| | | | |
|---|---|---|---|
| 1,006,974 | 10/1911 | Moore et al. | 248/180 X |
| 3,452,663 | 7/1969 | Machtig | 248/188.2 X |
| 3,596,945 | 8/1971 | Mulvin | 248/188.6 X |
| 4,032,099 | 6/1977 | Maude | 248/188.2 X |
| 4,106,413 | 8/1978 | Hoaglund | 248/439 X |
| 4,568,801 | 2/1986 | Gates et al. | 248/126 X |
| 4,902,079 | 2/1990 | Kaplan et al. | 248/126 X |
| 4,949,376 | 8/1990 | Nieves et al. | |

OTHER PUBLICATIONS

Panasonic Operating Instructions, Integrated Telephone System, Model No. KX-T2345, Easa-Phone Telephone with Automatic Dialer and Speakerphone, p. 15.
Panasonic Operating Instructions, Wall Mounting, Easa-Phone Cordless Phone System, p. 11.

*Primary Examiner*—Alvin C. Chin-Shue
*Attorney, Agent, or Firm*—Raymond A. Jenski; Roland R. Hackbart; Anthony J. Sarli

[57] ABSTRACT

A mechanism using a convertible mounting apparatus (103 and 105) for installing a communication device in both a horizontal and vertical configuration is described. The position of a wedge shaped platform (103) on the installation interface of the communications device (105) may be changed without separating the wedge shaped platform (103) from the installation interface of the communication device (105). In a vertical installation configuration, an aperture disposed in the installation interface of the communication device (105) further encompassed by the wedge shaped platform (103) provides a volume of space to store excess electrical cord (205) used for the communication device.

7 Claims, 2 Drawing Sheets

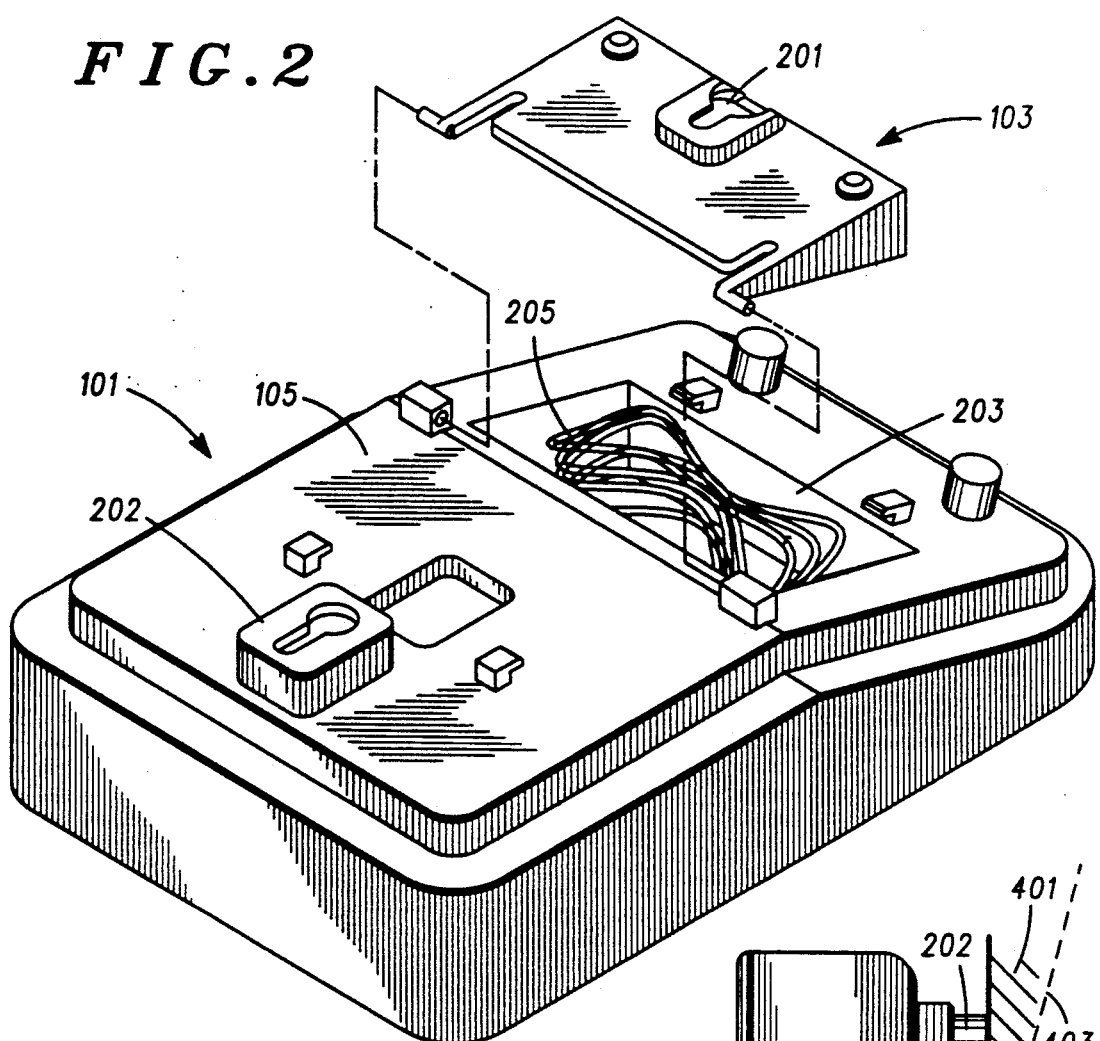
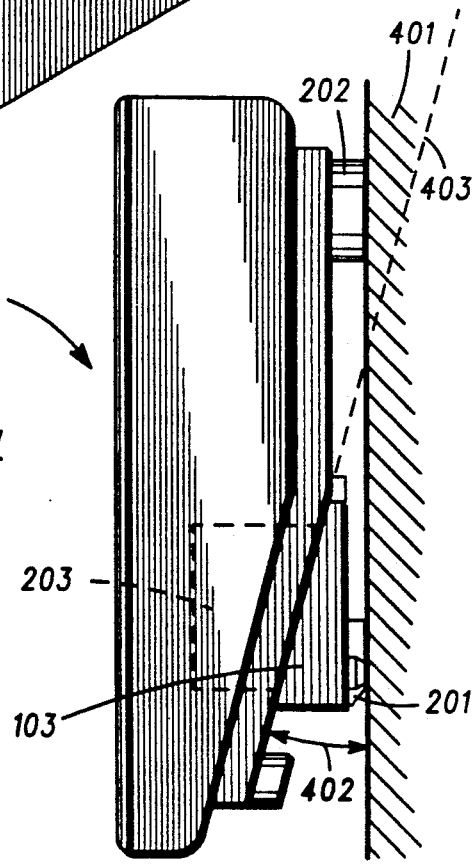

CONVERTIBLE MOUNTING APPARATUS

FIELD OF THE INVENTION

The present invention relates generally to mounting mechanisms, and, more particularly, to a convertible mounting apparatus including a platform and an installation interface for mounting a communication device in different planes.

BACKGROUND OF THE INVENTION

Communication devices such as landline telephones generally offer the consumer two installation options. Installation options typically are a vertical and horizontal mounting configuration. A telephone generally has the capability of being installed in either configuration.

As with many consumer products purchased by an individual, the consumer decides which installation configuration to implement. The consumer may choose to install the telephone in a horizontal configuration such as on a table, desk or counter top; or in a vertical configuration such as on a wall or post. At any time during the use of the telephone a consumer may decide to change the installation configuration of the telephone. The time duration of the telephone's use in either the horizontal or vertical installation configuration before it is changed may be a few hours or it may be many years. For instance, a telephone may initially be installed in a desk mount configuration; then after 10 years, the telephone is relocated and installed in a wall mount configuration.

The installation procedure for a horizontal or vertical configuration is well known. In a horizontal installation configuration, the telephone rests on the surface using gravitational force. In a vertical installation configuration, the telephone is mounted to two rivets separated by a standard distance and protruding from the vertical surface.

Telephones come in many shapes and sizes. Several telephones offer a feature which enable the telephone handset to be positioned at an angle relative to the user. This is typically accomplished by designing the profile of the telephone's base (which holds the handset) in the shape of a wedge or an obtuse angle. The obtuse angle design includes two surfaces in different planes on the bottom surface of the base. The bottom of the telephone base 105 is an installation interface. When one surface is placed against a wall or a desk, the second surface is angled away from the desk or wall, thus positioning the handset at an angle relative to the user. Since the profile of the base is not flat, a separate mechanism attached to the base is required for mounting the base in one or both installation configurations. The mechanism attached to the bottom of the base creates a plane for mounting the base in either a horizontal or vertical installation configuration.

For many telephones the attached mechanism is critical to the proper installation of the telephone in one or both configurations. A problem arises if the mounting mechanism should become lost between installation configurations. The result may be that the consumer's use of the telephone is limited to only one installation configuration. Worse yet, if the mounting mechanism is needed for both installation configurations, handling of the telephone could be clumsy.

In some vertical installation configurations, the mounting mechanism is also used to hold the bundled excess telephone cord. For aesthetic and safety reasons it is desirable not to have excess cord dangle along the wall. Although the mounting mechanism holds the excess cord behind the telephone base, the cord remains visible when the telephone base is viewed from the side. Some other telephones are supplied with a short cord. This approach eliminates the excess cord problem but increases the manufacturer's cost of the telephone and the users likelihood of losing the cord between changing installation configurations.

Therefore, there is a need for a mounting mechanism connected to the bottom of the telephone base 105 which may be repositioned for use in both installation configurations without being disconnected. There is also a need to store the bundled excess telephone cord behind the telephone base in a vertical installation configuration so that it cannot be seen.

SUMMARY OF THE INVENTION

A convertible mounting apparatus includes a platform and an installation interface to mount a device in at least one plane. The installation interface is coupled to the device. The platform has at least a first surface and a second surface intersecting in a vertex. The installation interface has at least a first surface and a second surface intersecting at an edge. The first and second surfaces having a first interface angle disposed between said first surface and an imaginary extension of said second surface, and a second interface angle disposed between said second surface and an imaginary extension of said first surface, said first interface angle, said second interface angle and said acute angle having essentially the same magnitude. The vertex of the platform is connected to the edge of the installation interface and the platform is positioned and retained in one of at least a first and second position whereby said acute angle is disposed within a corresponding one of said first and second interface angles.

BRIEF DESCRIPTION OF THE DRAWINGS

FIG. 2 is an exploded view of a telephone base viewed from the mounting surface with a wedge shaped platform positioned for a vertical installation configuration.

FIG. 4 is a side view of a telephone base and a wedge shaped platform in a vertical installation configuration.

DETAILED DESCRIPTION OF A PREFERRED EMBODIMENT

Figure 1:
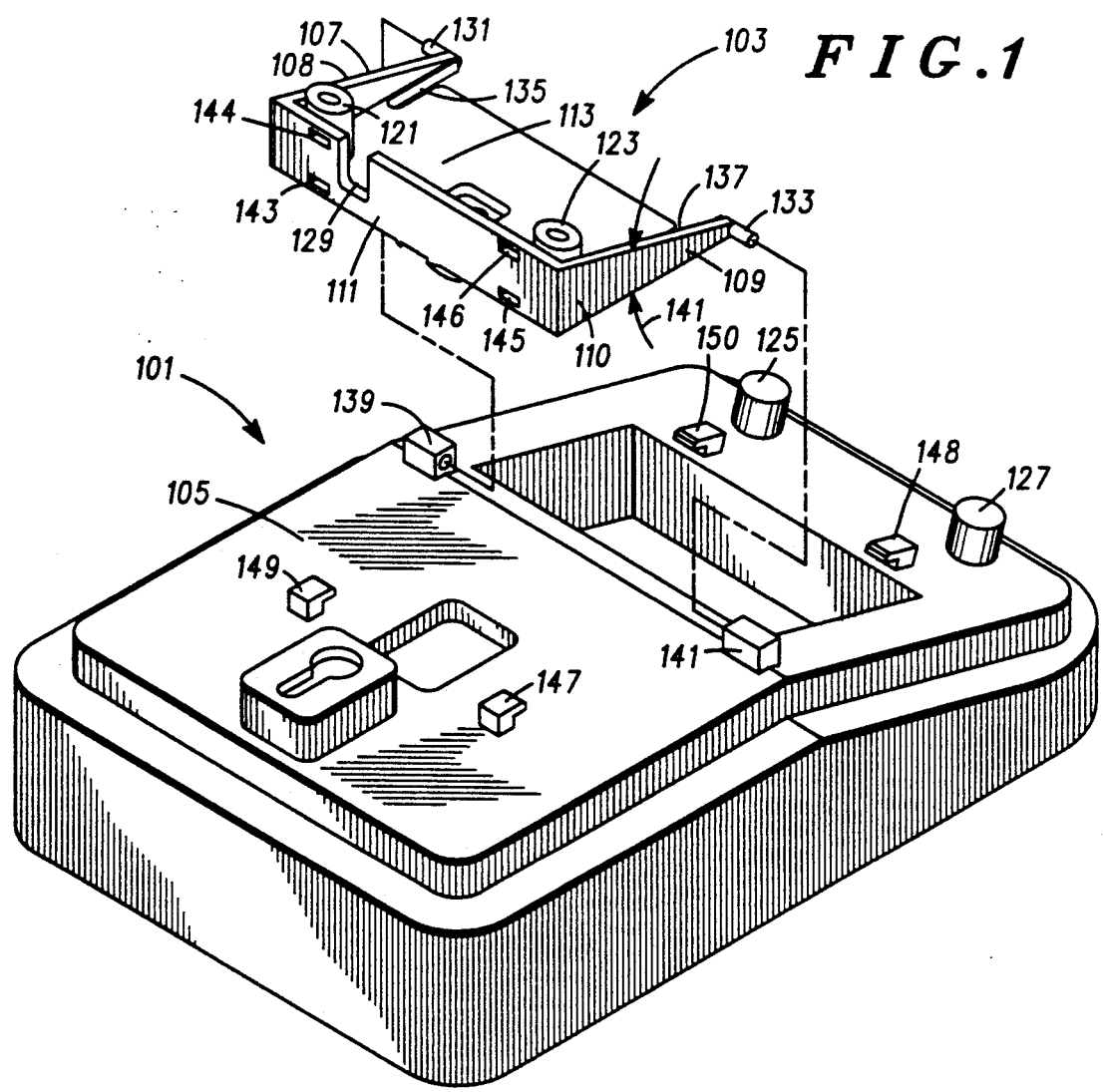
FIG. 1 is an exploded view of a telephone base viewed from the mounting surface with a wedge shaped platform positioned for a horizontal installation configuration.

FIG. 1 shows an exploded view of a telephone base 101 with a wedge shaped platform 103 positioned for a horizontal installation configuration. The bottom side of the telephone base 105 is shown so that we can fully appreciate the role of the wedge shaped platform in mounting the telephone base 101. A horizontal installation configuration may include placing the telephone base 101 on a desk, table, or counter top.

The wedge shaped platform 103 has four sides. In the preferred embodiment, each side has a similar thickness of two millimeters such that a hollow wedge is formed. The first side 107 and the second side 109 which are located on opposite ends of the wedge shaped platform 103 have a trapezoid shape. The third side 111 and fourth side 113 are joined perpendicularly to each other at their respective edges. The first side 107 and the second side 109 are joined perpendicularly to opposite end edges of the third side 111 and the fourth side 113. The third side 111 is joined perpendicularly to the wide end of the wedge of the first side 107 and the second side 109. An acute angle 141 determined by the intersection of nonparallel edges of the first side 107 and the second side 109 of the wedge shaped platform 103 is, in the preferred embodiment, 14 degrees. The angle 141 is bounded by the intersection of first surface and a second surface. The two surfaces include the nonparallel edges of the first side 107 and second side 109. A third surface comprises the first side 107, second side 109 and third side 111. The specific angle and the dimensions of the wedge shaped platform are determined by the shape and size of the telephone base. Standard molding practices are used to mold the wedge shaped platform 103.

The intersections of first side 107, second side 109 and third side 111 include two cylindrical posts 121 and 123, one in each corner. These two posts along with two additional cylindrical post 125 and 127, disposed on the bottom surface of the base 105, provide four locations in the same plane for stability on a horizontal surface.

A slot 129 located in the third side 111 provides an exit for a telephone cord (not shown) when the telephone base 101 is installed in a horizontal configuration.

The wedge shaped platform 103 includes two cylindrical pins 131 and 133. The first pin 131 is attached perpendicularly to an outside surface 108 of the first side 107 near the vertex of acute angle 141. The second pin 133 is attached perpendicularly to an outside surface 110 of the second side 109 near the vertex of acute angle 141. The purpose of the pins is to attach the wedge shaped platform 103 to the telephone base 101 and provide a hinge point about which the wedge shaped platform can pivot.

The wedge shaped platform 103 is attached to the telephone base 101 by deflecting the first side 107 and the second side 109 near the first pin 131 and the second pin 133 toward each other. Aperture 135 and 137 in the fourth side 113 allow this deflection to occur. Once the first side 107 and the second side 109 are deflected inward, the pins 131 and 133 are located in front of corresponding holes 139 and 142 in the telephone base 101. The first side 107 and second side 109 are then released allowing the first pin 131 to enter the hole 139 in the telephone base 101 and the second pin 133 to enter the hole 142 in the telephone base 101. This method of attachment is convenient, fast and does not require any tools.

The third side 111 also includes four apertures which extend through a portion of the thickness of the side material. These apertures provide a point of attachment between the wedge shaped platform 103 and the telephone base 101 once the wedge shaped platform 103 is pivoted to its correct position. For a horizontal installation configuration, as shown in FIG. 1, aperture 143 in the wedge shaped platform is captured by snap 149 of the telephone base and aperture 145 is captured by snap 147. For a vertical installation configuration, the wedge shaped platform 103 is rotated 180°. In this configuration, aperture 144 is captured by snap 150 and aperture 146 is captured by snap 148.

Now referring to FIG. 2, there is shown an exploded view of a telephone base 101 with a wedge shaped platform 103 positioned for a vertical installation configuration. The perspective view in FIG. 2 is essentially the same as in FIG. 1 except that the wedge shaped platform 103 is pivoted 180°. A vertical installation configuration is suitable for applications such as mounting the telephone base 101 to a wall or a post.

The wedge shaped platform 103 includes a slot and hole detail 201 which corresponds with slot and hole detail 202 attached to the telephone base 101. The slot and hole details 201 and 202 together comprise the mounting mechanism for a vertical surface. The distance between these two details is an industry standard. In a vertical installation configuration, a local telephone company usually provides a mounting plate with two protruding rivet posts that lie along a line within a fixed distance from each other. The two protruding rivet posts provided enter the holes in detail 201 and 202 and slides along the slot in detail 201 and 202 to secure the telephone base 101 to the wall.

Telephone base 101 includes an aperture 203. The box 203 is enclosed on all sides except the side opening to the bottom of the telephone base 105. The aperture 203 together with the wedge shaped platform 103 create an enclosed volume of space. For aesthetic and safety reasons, it is desirable not to have the excess cord dangle along the wall. This enclosed volume of space provides a unique way to conceal the excess telephone cord 205 in a vertical installation configuration so that the cord is not visible when the telephone base 101 is viewed from the side.

Figure 3:
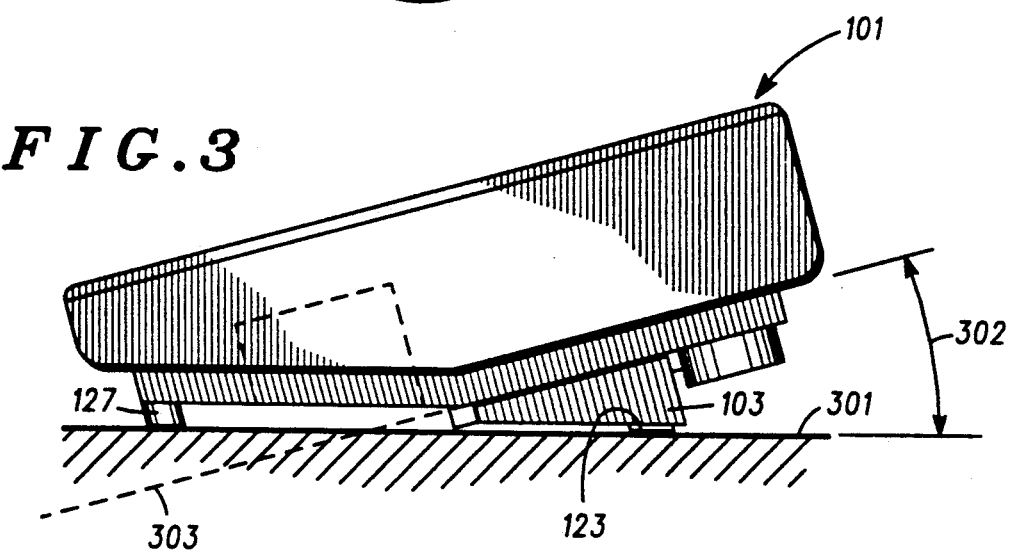
FIG. 3 is a side view of a telephone base and a wedge shaped platform in a horizontal installation configuration.

Now referring to FIG. 3, there is shown a side view of a telephone base 101 and a wedge shaped platform 103 in a horizontal installation configuration. The horizontal surface 301 may be a table, desk, or counter top. This view clearly shows the advantages of using a wedge shaped platform 103 to stabilize a telephone base 101 on a horizontal surface. The cylindrical post on the wedge shaped platform 123 is in the same horizontal plane with the cylindrical post on the telephone base 127 to provide stability. In this configuration, the platform 103 is oriented such that angle 141 falls within angle 302.

Now referring to FIG. 4 there is shown a side view of a telephone base 101 and a wedge shaped platform 103 in a vertical installation configuration. A vertical installation configuration may include mounting the telephone base to a wall or a post 401. The telephone base is installed in a vertical configuration using slot and hole detail 201 and 202. In a vertical installation configuration, slot and hole detail 201 on wedge shaped platform 103 and slot and hole detail 202 on the bottom surface of telephone base 105 are in the same plane. In this configuration, the platform 103 is oriented such that angle 141 falls within angle 402.

The volume of space bounded by aperture 203 and the wedge shaped platform 103 provides space to conceal a bundled excess telephone cord 205. One can see from the side view of FIG. 4 that the excess cord would not be visible behind the telephone base 101.

In the preferred embodiment we have described a wedge shaped platform 103 permanently attached to a telephone base 101 which may be used in both a horizontal and vertical installation configuration. The platform is wedge shaped with an acute angle greater than zero degrees. The wedge shaped platform 103 is conveniently attached to the telephone base 101 without the use of tools. The wedge shaped platform 103, at its point of attachment, is allowed to pivot 180°. The wedge shaped platform may be used in a horizontal installation configuration and later changed to a vertical installation configuration without removing the wedge shaped platform 103 from the bottom surface of the telephone base 105. The wedge shaped platform 103 is retained by the telephone base 101 using snaps disposed on the bottom surface of the telephone base and apertures disposed in the free end of the wedge shaped platform to retain the position the wedge shaped platform 103 for each installation configuration. In the vertical installation configuration the bundled excess telephone cord is essentially concealed within the space bounded by the aperture 203 in the telephone base 101 and the wedge shaped platform 103.

We claim:

1. A convertible mounting apparatus for mounting a communication device in one of at least a first plane and a second plane, the convertible mounting apparatus comprising:
   a platform with at least a first and a second surface said first and second surfaces intersecting at a vertex thereby defining an acute angle;
   an installation interface having a first and second surface each in non-parallel planes, said first and second surfaces intersecting at an edge, and having a first interface angle disposed between said first surface and an imaginary extension of said second surface, and a second interface angle disposed between said second surface and an imaginary extension of said first surface, said first interface angle, said second interface angle and said acute angle having essentially the same magnitude;
   means for connecting said vertex of said platform to said edge of said installation interface; and
   means for retaining said platform in each of a said first and second position such that said acute angle is disposed within corresponding said first and second interface angles to produce an essentially planar surface for mounting the communication device in the first and second planes, respectively.

2. A convertible mounting apparatus in accordance with claim 1 wherein said means for positioning further comprises a hinge mechanism.

3. A convertible mounting apparatus in accordance with claim 1 wherein a third surface is disposed between and coupled to at least one of said first and second surfaces of said platform, said means for retaining further comprises:
   at least a first and a second flexible member disposed on said first and second surfaces of said installation interface, respectively;
   at least a first and second aperture disposed in said third surface of said platform, wherein said first and second flexible members are at least partially disposed in said first and second apertures when said platform is in said first and second positions.

4. A convertible mounting apparatus in accordance with claim 1 further comprising means for storing a communication device cord at least partially within said first and second surfaces of said platform.

5. A convertible mounting apparatus in accordance with claim 4 wherein said means for storing further comprises an aperture disposed in said second surface of the installation interface.

6. A convertible mounting apparatus to mount a telephone device in at least a first plane and a second plane, the convertible mounting apparatus comprising:
   a platform having a hollow wedge shaped configuration with a first, second, third and fourth side, all four sides having essentially the same predetermined thickness, said first and second sides having a trapezoidal shape each with a third and fourth edge disposed between a first and second nonparallel edge, said third edge having greater length than said fourth edge said third side having a rectangular shape with a first, second, third and fourth edge, said fourth side having a rectangular shape with a first, second and third edge, said third edge of said third side joined essentially perpendicularly to said third edge of said first side, said fourth edge of said third side joined essentially perpendicularly to said third edge of said second side, said joined edges having essentially the same length, said first edge of said fourth side joined essentially perpendicularly to said second edge of said first side, said second edge of said fourth side joined essentially perpendicularly to said second edge of said second side, said third edge of said fourth side joined essentially perpendicularly to said second edge of said third side, said joined edges having essentially the same length;
   cylindrical posts protruding from said first and second sides adjacent said fourth edge in essentially the same relative position on the outside surface of said platform, an acute angle disposed between said first and second nonparallel edges;
   an installation interface having a first and second surface in different planes intersecting at an edge, an aperture disposed in said second surface, a first interface angle disposed between said first surface and an imaginary extension of said second surface, a second interface angle disposed between said second surface and an imaginary extension of said first surface, said first interface angle, said second interface angle and said acute angle having essentially the same magnitude;
   means for positioning said cylindrical posts within corresponding apertures located at said edge intersection of said first and second surfaces on the installation interface, said cylindrical posts capable of rotational movement within said corresponding apertures;
   a retainer for said platform further comprising, at least one flexible snap member disposed on said first surface of the installation interface, and at least one aperture disposed in said third side of said platform, said flexible snap member at least partially disposed in said one aperture retaining the platform in a first position of said at least a first and second position, said first position having said acute angle of said platform disposed in said first interface angle, and a second position having said acute angle of said platform disposed in said second interface angle.

7. A convertible mounting apparatus in accordance with claim 6 further comprising a volume of space for storing a device cord encompassed by said first, second, third and fourth sides of said platform and said one aperture disposed in said second surface of said installation interface.

* * * * *

UNITED STATES PATENT AND TRADEMARK OFFICE
CERTIFICATE OF CORRECTION

PATENT NO. : 5,087,004

DATED : 2/11/92

INVENTOR(S) : Louis J. Lundell, Kenneth W. Carlson

It is certified that error appears in the above-identified patent and that said Letters Patent is hereby corrected as shown below:

In column 5, line 44, replace the word positioning, with connecting.

Signed and Sealed this

Twenty-fifth Day of May, 1993

Attest:

MICHAEL K. KIRK

*Attesting Officer*  Acting Commissioner of Patents and Trademarks